United States Patent Office 2,799,681
Patented July 16, 1957

2,799,681

2-CHLOROALKANOLPYRIDINE-N-OXIDES

Francis E. Cislak, Indianapolis, Ind., assignor to Reilly Tar & Chemical Corporation, Indianapolis, Ind., a corporation of Indiana No Drawing. Application July 23, 1956,
Serial No. 599,321

7 Claims. (Cl. 260—297)

This invention relates to 2-chloroalkanolpyridine-N-oxides and to the process of making them. More particularly it relates to 2-chloroalkanolpyridine-N-oxides having the general formula:

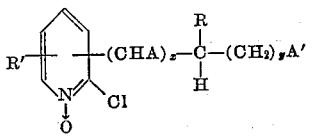

where $x$ and $y$ are integers selected from the group consisting of 0, 1, and 2, A and A' are one of the group consisting of hydrogen and hydroxyl and they may not be alike, R is one of the group consisting of hydrogen and lower alkyl, and R' is one of the group consisting of lower alkyl, hydrogen, hydroxy-lower alkyl, and benzyl.

It is known that 2-aminopyridine is not oxidized to the -N-oxide by means of peroxide. Also alkanolpyridines are oxidized to the corresponding carboxylic acids under conditions one might except would give the -N-oxide. I have found, however, that if in the amino-alkanolpyridines I acylate the amino group and convert the alcohol group to an ester, I can oxidize the resulting acetamidoalkanolpyridine ester to the corresponding aminoalkanolpyridine-N-oxide in good yield. I find further that I can convert the 2-amino-alkanolpyridine-N-oxide to the corresponding 2-chloro-alkanolpyridine-N-oxide in good yield.

My invention will be described more fully in conjunction with the following specific examples. It should be understood, however, that these examples are given by way of illustration only and that my invention is not to be limited by the details set forth therein.

EXAMPLE 1

*2-chloro-6-methanolpyridine-N-oxide*

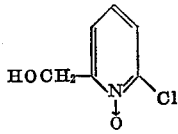

To a solution of 208 grams of 6-(2-acetamidopyridyl) carbinol acetate and about 200 cc. of glacial acetic acid heated to a temperature of about 75° C., there is added about 150 grams of hydrogen peroxide (50%). The hydrogen peroxide is preferably added in small portions during a four-hour period. The temperature of the solution is maintained at 75° C. during the addition of the hydrogen peroxide. After all of the hydrogen peroxide has been added, the solution is maintained at a temperature of 75° C. to 85° C. for an additional 16-20 hours. Then the temperature of the solution is raised to about 95° C. and paraformaldehyde is added to destroy any unreacted hydrogen peroxide. The absence of the hydrogen peroxide is readily established by testing with potassium iodide. The peroxide free solution is concentrated by distilling off (under vacuum) the water and most of the acetic acid. To the concentrated residue there is added about 1000 cc. of about 15% hydrochloric acid. The resulting solution is heated under refluxing conditions for about two to four hours and is then concentrated by distilling off about 700 cc. of a mixture of water, acetic acid (this was liberated during the refluxing with hydrochloric acid) and hydrochloric acid. The resulting 2-amino-6-methanolpyridine-N-oxide may be recovered in any convenient manner. I, however, prefer not to isolate the 2-amino-6-methanolpyridine-N-oxide but instead I prefer to use this solution to prepare my 2-chloro-6-methanolpyridine-N-oxide as follows:

The concentrated solution of 2-amino-6-methanolpyridine-N-oxide is diluted with water to a total volume of about 1000-1500 cc. The resulting solution is cooled to about −15° C. and is then saturated with hydrogen chloride gas; care should be taken not to allow the temperature to rise above about −10° C. While stirring the solution and maintaining the temperature below about −10° C., there is added slowly in small portions, 200 grams of solid sodium nitrite. After all of the sodium nitrite has been added, the solution is allowed gradually to warm up to room temperature (about 25-30° C.) and is allowed to remain at this temperature overnight. The 2-chloro-6-methanolpyridine-N-oxide formed may be recovered in any convenient manner. One convenient way is as follows: The hydrochloric acid present is neutralized with a 10% caustic soda solution, care being taken not to allow the temperature of the solution to rise above about 30° C. Most of the water is then removed from the solution by freeze drying. The 2-chloro-6-methanolpyridine is recovered from the residue by extraction with benzene. Evaporation of the benzene yields 2-chloro-6-methanolpyridine-N-oxide of high purity.

EXAMPLE 2

*2-chloro-4-(1-propan-3-ol)pyridine-N-oxide*

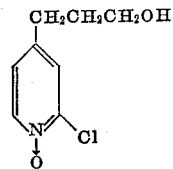

The procedure of Example 1 is repeated with the exception that 2-acetamido-4-(1-propan-3-ol)pyridine acetate is used in place of the 6-(2-acetamidopyridyl) carbinol acetate.

EXAMPLE 3

*2-chloro-3-ethyl-6-(1-ethan-2-ol)pyridine-N-oxide*

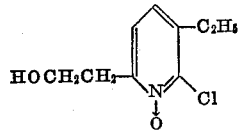

The procedure of Example 1 is repeated with the exception that 2-acetamido-3-ethyl-6-(1-ethan-2-ol)pyridine acetate is used instead of the 6-(2-acetamidopyridyl) carbinol acetate.

EXAMPLE 4

*2-chloro-4-(1-propan-3-ol)-6-(1-ethan-2-ol)pyridine-N-oxide*

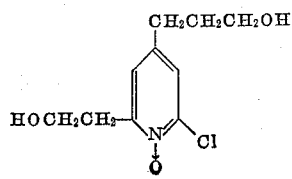

The procedure of Example 1 is repeated with the exception that 2-acetamido-(1-propan-3-ol)-6-(1-ethan-2-ol)pyridine acetate is used in place of the 6-(2-acetamidopyridyl)carbinol acetate.

EXAMPLE 5

*2-chloro-3-ethyl-6-(1-propan-3-ol)pyridine-N-oxide*

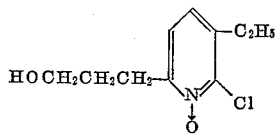

The procedure of Example 1 is repeated with the exception that 2-acetamido-3-ethyl-6-(1-propan-3-ol)pyridine acetate is used in place of 6-(2-acetamidopyridyl)-carbinol acetate.

The 2-chloroalkanolpyridine-N-oxides of my invention are useful in the preparation of the 2-mercapto-alkanolpyridine-N-oxides which are described in my copending application Serial No. 599,324 filed even date herewith. In general, the 2-mercaptoalkanolpyridine-N-oxides are prepared by the reaction of the corresponding 2-halogenoalkanolpyridine-N-oxide with an alkali metal hydrosulfide.

I claim as my invention:

1. A compound of the class consisting of 2-chloroalkanolpyridine-N-oxides having the following general formulae:

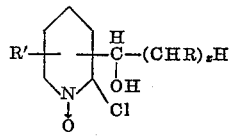

and

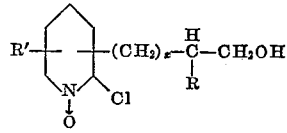

where $x$ is an integer selected from the group consisting of 0, 1, and 2, R is one of the group consisting of hydrogen and lower alkyl, and R' is one of the group consisting of lower alkyl, hydrogen, hydroxy-lower alkyl, and benzyl.

2. 2-chloro-4-(1-propan-3-ol)pyridine-N-oxide.
3. 2-chloro-6-(1-propan-3-ol)pyridine-N-oxide.
4. 2-chloro-3-ethyl-6-(1-propan-3-ol)pyridine-N-oxide.
5. 2-chloro-6-methanolpyridine-N-oxide.
6. 2-chloro-3-ethyl-6-(1-ethan-2-ol)pyridine-N-oxide.
7. The process of preparing the compounds of claim 1 which comprises oxidizing, at an elevated temperature, with hydrogen peroxide an acetic acid solution of a compound of the class consisting of 2-acetamidoalkanolpyridine acetates having the following general formulae:

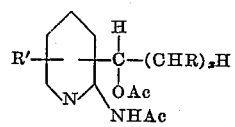

and

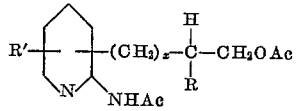

where $x$ is an integer selected from the group consisting of 0, 1, and 2, R is one of the group consisting of hydrogen and lower alkyl, and R' is one of the group consisting of hydrogen, lower alkyl, hydroxy-lower alkyl, and benzyl, hydrolyzing the resultant compound and reacting, at a low temperature, the thus liberated 2-aminoalkanolpyridine-N-oxide, with hydrochloric acid and sodium nitrite.

References Cited in the file of this patent

Robe et al.: Chem. Abstracts, vol. 32, column 8420 (1938).

Bachmann et al.: J. Am. Chem. Soc., vol. 70, pp. 2381–4 (1948).